Aug. 5, 1969  H. J. SCHELLSTEDE ET AL  3,458,922
METHOD OF CONSTRUCTING A DRILL PIPE PROTECTOR MEANS
Filed June 13, 1967
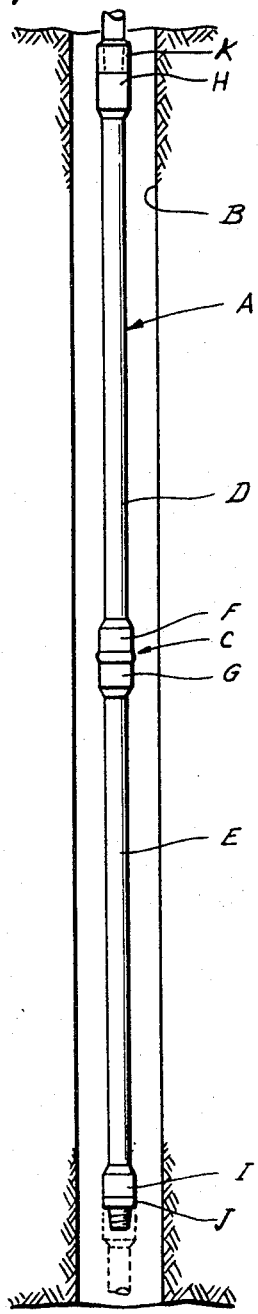
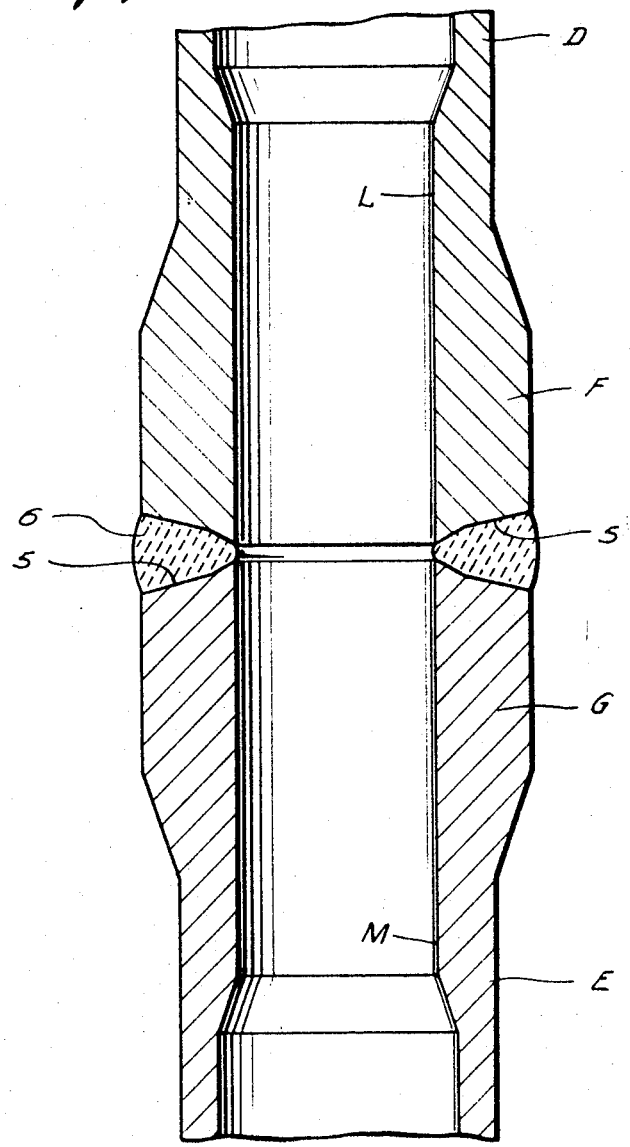
Herman J. Schellstede
Thomas M. Sanders
INVENTORS
BY Bertram A. Mann
ATTORNEY

# United States Patent Office 3,458,922
Patented Aug. 5, 1969

3,458,922
METHOD OF CONSTRUCTING A DRILL PIPE PROTECTOR MEANS
Herman J. Schellstede, Houma, and Thomas M. Sanders, New Iberia, La., assignors, by mesne assignments, to Herman J. Schellstede, New Iberia, La.
Filed June 13, 1967, Ser. No. 645,738
Int. Cl. B23k 11/02
U.S. Cl. 29—475                                2 Claims

ABSTRACT OF THE DISCLOSURE

A method of fabricating a drill pipe assembly from a plurality of sections of drill pipe. The method includes forming thickened end portions on at least one end of each section, forming threaded couplings on the other ends of at least two of the sections, aligning the sections with the thickened end portions thereof in abutting relationship and welding the abutting end portions together to form a continuous pipe assembly. The welded portions forms a continuous, integral thickened protector collar located intermediately of the pipe assembly.

BACKGROUND OF THE INVENTION

Field of the invention

This invention relates to protector structure for drill pipes and methods of constructing the same.

Prior art

In rotary drilling of bore holes, for instance, for oil wells, is is sometimes desirable and frequently necessary to equip the string of drill pipe with protecting sleeves or other devices at intervals therealong. The purpose of such devices is to resist abrasion and other damaging of the pipe itself due to contact with the bore wall, as at bends in the bore hole or due to bending and whipping of the pipe. However, the prior art has not provided examples of relatively inexpensive drill pipe protectors which are sufficiently rugged and firmly attached to the drill pipe to resist sliding along the pipe or breakage due to blows or wear during normal usage. For instance, protectors equipped with rubber or other resilient linings between the pipe and protector collar have not proven sufficiently rugged to withstand the heavy blows, high temperatures, and other damaging effects to which the protector is subjected in normal use. Furthermore, collars formed of two or more segments to facilitate application to pipe sections having upset or otherwise thickened extremities, as is customary, are liable to being broken off and to dropping into the hole.

SUMMARY OF THE INVENTION

In accordance with the present invention, a pair of drill pipe sections are aligned end-to-end and connected by butt welding to form a continuous pipe section. The now aligned and integrally joined upsets at the joined ends of the sections form an integral collar intermediately of the pipe which serves admirably as a drill pipe protector.

BRIEF DESCRIPTION OF THE DRAWINGS

In the accompanying drawings which illustrate the invention,

FIG. 1 is an elevation of two sections of drill pipe joined in accordance with one form of this invention.

FIG. 2 is an enlarged longitudinal section through the joined pipe ends of FIG. 1.

DESCRIPTION OF THE PREFERRED EMBODIMENTS

FIG. 1 shows a drill pipe string, generally designated A, suspended in a bore hole B. At the center of the illustrated portion of string A is the protector-collar portion, generally designated C, which is more specifically illustrated in FIG. 2. The illustrated portion of the drill pipe consists of an upper pipe section D and a lower pipe section E having internally thickened portions L and M, abutting, terminal upsets F and G, integrally butt welded, and distal upsets H and I to which have been secured pin and box tool joints J and K. Pipe with terminal external enlargements, as at F and G, is commercially obtainable, for instance, under the trade name Bell Weld.

With reference now to FIG. 2, each of the upsets F and G at the adjacent ends of pipe sections D and E is chamfered as at 5. The upset ends F and G are then brought into aligned abutment in a suitable jig to form a peripheral V between the chamfers. Weld metal, as at 6, is then laid in this circumferential V-groove. Preferably, the pipe ends are first heated to approximately 500° F. and the weld area itself heated to approximately 600° F. for a distance of approximately 2″ on each side of the end chamfers. Then, using ⅛″ electrodes, the first pass around the joint is made and scaled. Immediately thereafter, the second pass around the joint is made using ⁵⁄₃₂″ electrodes, and successive passes of welding and scaling are continued until the entire weld area is completed. Post-heating of the weld to 1000° F. is recommended, followed by slow cooling as within asbestos paper or other wrapping.

The surfaces of upset regions F and G may be hard surfaced if desired, as may the outer surface of weld metal 6. However, the thickened walls of the upset portions generally will prove adequate to protect the drill pipe from damaging abrasive action as well as blows during drilling.

Where two sections of so-called range 1 pipe approximately 20 feet in length are joined in the manner described, a range 3 pipe results. The thickened collar at the center portion of the joined pipes is adequate, as stated to form a protective collar. The joined terminal upsets may each be approximately six inches long, so that the completed collar will be about twelve inches long. These special upsets may be provided at both ends of the pipe sections, or at the abutting ends only. To finish the joined pipes, box and pin tool joints, as K and J, are secured in the usual manner to the opposite distal extremities. Where the external upsets F and G are not provided, as is often the case in ordinary drill pipe, suitable special enlargement means will be provided.

Other types of butt welding may be used, for instance, flash welding, pressure welding, friction, or electron beam welding, and the abutting ends of the pipe will be prepared for welding accordingly. If desired, registering tongue and groove may be provided at the abutting pipe ends to assist in alignment.

The invention may be modified in various respects as will occur to those skilled in the art, and the exclusive use of all modifications as come within the scope of the appended claims is contemplated.

We claim:

1. The method of fabricating a unitary length of drill pipe for rotary drilling of wells which comprises the steps of forming a plurality of pipe sections of drill pipe toughness and strength characteristics, forming externally thickened integral end portions on at least one end of each section, forming threaded tool joint couplings on other ends of at least two of said sections, aligning said sections with the thickened end portions thereof in abutting relationship, preheating the confronting regions of said abutting end portions preparatory to welding, butt welding said abutting end portions to form integral protector collar means medially of the combined sections having outside and inside diameters approximately the outside and inside diameters of the threaded couplings on the sections, and post-heating and cooling the welded regions of said collar means for normalizing the same and preserving the drill pipe metallurgical and structural characteristics.

2. The method of fabricating drill pipe described in claim 1 including the further steps of internally thickening said integral end portions inwardly beyond the inner extremities of the externally thickened portions thereof and tapering the inner extremities of said inner and outer thickened portions to distribute stresses therein.

References Cited

UNITED STATES PATENTS

| | | | |
|---|---|---|---|
| 2,220,773 | 11/1940 | Moore | 285—286 |
| 2,232,593 | 2/1941 | Diescher | 285—286 |
| 2,258,913 | 10/1941 | Stone | 285—22 |
| 2,259,232 | 10/1941 | Stone | 285—286 |
| 1,881,160 | 10/1932 | Armacost | 29—482 |
| 3,195,229 | 7/1965 | Culver | 29—482 |

FOREIGN PATENTS 202,300   1/1939   Switzerland.

JOHN F. CAMPBELL, Primary Examiner

D. C. REILEY, Assistant Examiner

U.S. Cl. X.R.

29—482; 285—45, 286